(12) United States Patent
Lee et al.

(10) Patent No.: US 10,140,535 B2
(45) Date of Patent: Nov. 27, 2018

(54) DISPLAY DEVICE FOR DISPLAYING RECOMMENDED CONTENT CORRESPONDING TO USER, CONTROLLING METHOD THEREOF AND COMPUTER-READABLE RECORDING MEDIUM

(71) Applicant: SAMSUNG ELECTRONICS CO., LTD., Suwon-si (KR)

(72) Inventors: Dong-ho Lee, Seoul (KR); Byoung-hyun Kim, Suwon-si (KR); Kyoung-jae Park, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 15/191,626

(22) Filed: Jun. 24, 2016

(65) Prior Publication Data

US 2017/0083778 A1 Mar. 23, 2017

(30) Foreign Application Priority Data

Sep. 17, 2015 (KR) .......................... 10-2015-0131394

(51) Int. Cl.
*G06K 9/00* (2006.01)
*G06K 9/62* (2006.01)
*G06F 3/00* (2006.01)

(52) U.S. Cl.
CPC ......... *G06K 9/00892* (2013.01); *G06F 3/005* (2013.01); *G06K 9/00362* (2013.01); *G06K 9/6202* (2013.01); *G06K 2009/00322* (2013.01)

(58) Field of Classification Search
CPC ............. G06K 9/00892; G06K 9/6202; G06K 9/00362; G06F 3/005
See application file for complete search history.

(56) References Cited

U.S. PATENT DOCUMENTS 7,174,029 B2 * 2/2007 Agostinelli ............ G06Q 30/02
382/100
2011/0209066 A1 8/2011 Sakata et al.
(Continued)

FOREIGN PATENT DOCUMENTS

KR 20110100008 A * 9/2011
KR 1020110100008 A 9/2011
(Continued)

OTHER PUBLICATIONS

Communication dated Sep. 30, 2016, issued by the International Searching Authority counterpart International Application No. PCT/KR2016/006572 (PCT/ISA/210 & PCT/ISA/237).

*Primary Examiner* — Bhavesh Mehta
*Assistant Examiner* — Menatoallah Youssef
(74) *Attorney, Agent, or Firm* — Sughrue Mion, PLLC

(57) ABSTRACT

A display device is provided. The display device includes a display configured to display a content, an input unit configured to obtain a photographed image of a user, a storage configured to store feature information of each pre-classified age stage and a processor configured to compare a feature part in the photographed image with the feature information of each age stage stored in the storage, and calculate an age matching probability the feature part with each age stage. The processor selects a plurality of age stages among all age stages by comparing the age matching probability with a preset threshold value, controls the display to display a combined content which includes a plurality of recommended contents corresponding to each of the selected plurality of age stages.

17 Claims, 9 Drawing Sheets

(56) References Cited

U.S. PATENT DOCUMENTS

| | | | |
|---|---|---|---|
| 2012/0300061 A1* | 11/2012 | Osman | G06F 1/3231 |
| | | | 348/135 |
| 2012/0314957 A1* | 12/2012 | Narikawa | G06K 9/00288 |
| | | | 382/195 |
| 2013/0195322 A1* | 8/2013 | Santhiveeran | G06Q 30/0269 |
| | | | 382/118 |
| 2013/0241817 A1* | 9/2013 | Wang | G09F 27/00 |
| | | | 345/156 |
| 2014/0019227 A1* | 1/2014 | Walker | G06Q 30/0244 |
| | | | 705/14.43 |

FOREIGN PATENT DOCUMENTS

| | | |
|---|---|---|
| KR | 1020130076977 A | 7/2013 |
| KR | 1020140010673 A | 1/2014 |

* cited by examiner

FIG. 1
(a)
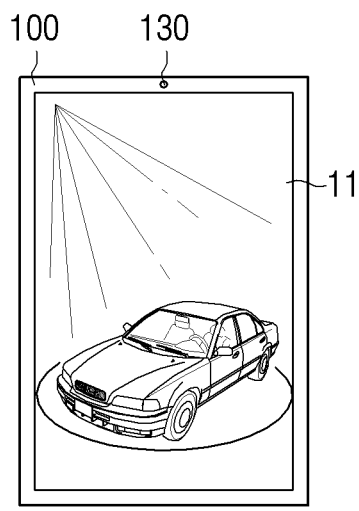
(b)
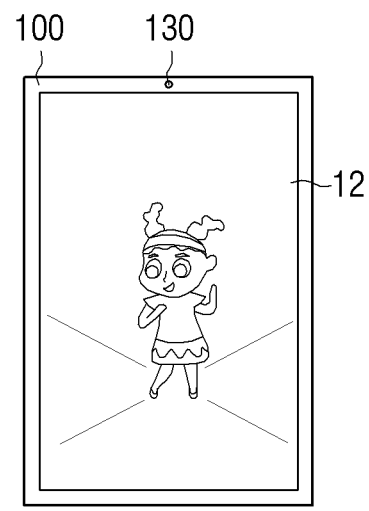
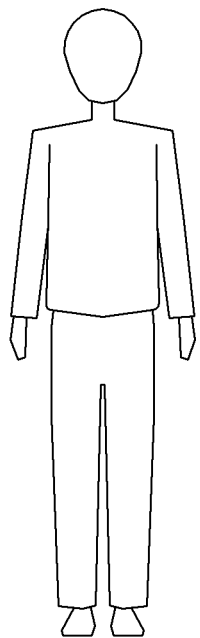
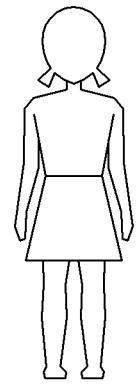

FIG. 7
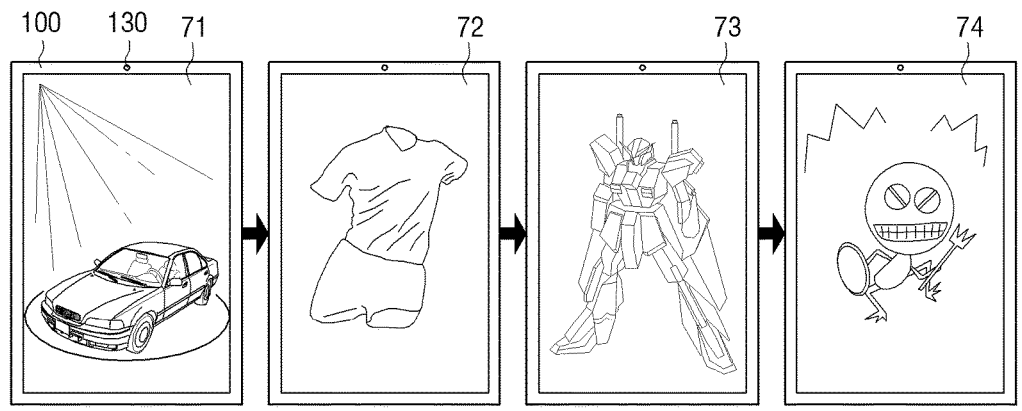
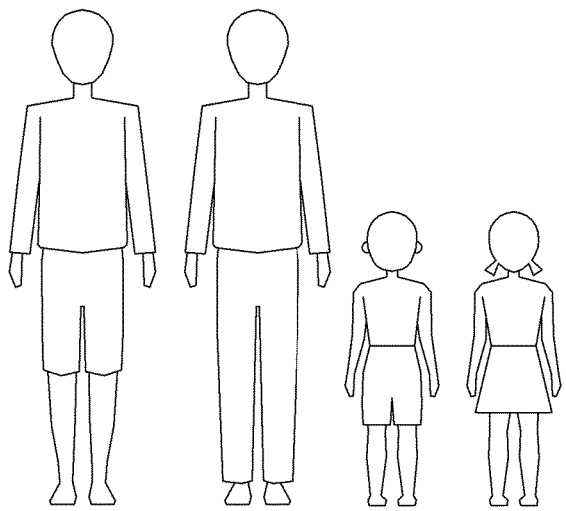

FIG. 8
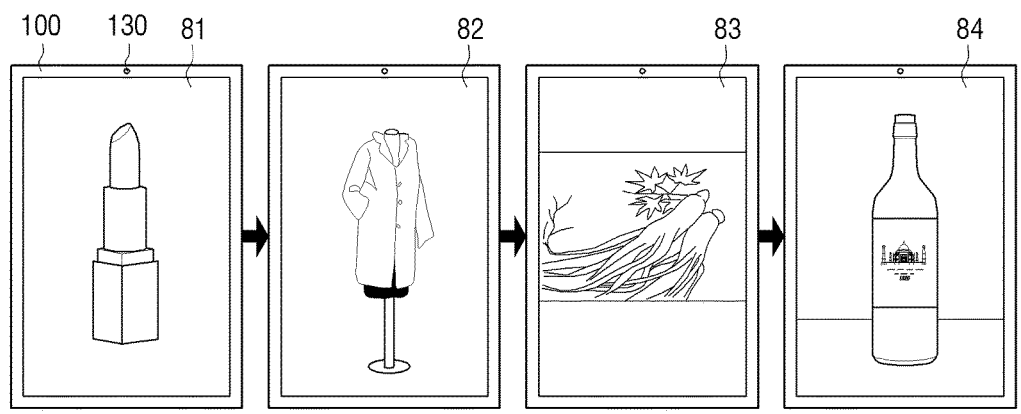
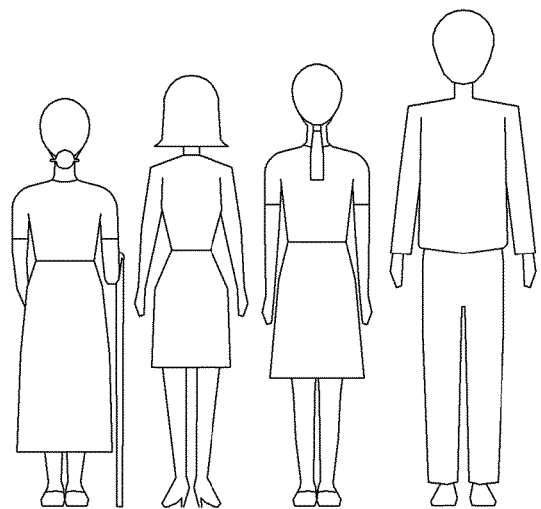

DISPLAY DEVICE FOR DISPLAYING RECOMMENDED CONTENT CORRESPONDING TO USER, CONTROLLING METHOD THEREOF AND COMPUTER-READABLE RECORDING MEDIUM

CROSS-REFERENCE TO RELATED APPLICATION

This application claims priority from Korean Patent Application No. 10-2015-0131394, filed in the Korean Intellectual Property Office on Sep. 17, 2015, the disclosure of which is incorporated herein by reference in its entirety.

BACKGROUND

1. Field

The present disclosure relates to a display device, a controlling method thereof and a computer-readable recording medium, and more particularly, to a display device which can provide a personalized content suitable for a user, a controlling method thereof and a computer-readable recording medium.

2. Description of the Related Art

Recently, as contents utilizing a large display increase and performance of various sensors is sophisticatedly developed, rather than a content for random people, there are a growing number of personalized contents which are based on a user watching a content.

In this circumstance, commercialized are interactive ads using an image sensor such as a camera which is widely used.

However, due to variables in environments where a camera is installed and different recognition rates according to detection algorithms, misrecognition problems occur, and when a content according to misrecognition is displayed, there may be a result of inducing repulsion from a user who is watching the content.

Accordingly, there is a need for technology of providing a content to reduce repulsion of a user who is watching the content even if misrecognition occurs on the user's age or gender.

SUMMARY

An aspect of the exemplary embodiments relates to a display device which can provide a personalized content suitable for a user, a controlling method thereof and a computer-readable recording medium.

According to an exemplary embodiment, there is provided a display device including a display configured to display a content, an input unit configured to obtain a photographed image of a user, a storage configured to store feature information of each pre-classified age stage, and a processor configured to compare a feature part in the photographed image with the feature information of each age stage stored in the storage, and calculate an age matching probability of matching the feature part with each age stage, and the processor selects a plurality of age stages among all age stages by comparing the age matching probability with a preset threshold value, and controls the display to display a combined content which includes a plurality of recommended contents corresponding to each of the selected plurality of age stages.

The storage may further store gender feature information, and the processor may determine the user's gender based on a gender matching probability of matching the feature part with each gender by comparing the feature part in the photographed image with the gender feature information, select the plurality of recommended contents corresponding to the selected plurality of age stages and the user's determined gender, and control the display to display the combined content which includes the plurality of recommended contents.

The processor may control the display to display a recommended content which is suitable for a male among the plurality of recommended contents corresponding to the selected plurality of age stages when the gender matching probability is in a first range, control the display to display a recommended content which is suitable for a female among the plurality of recommended contents corresponding to the selected plurality of age stages when the gender matching probability is in a second range which is different from the first range, and control the display to display a recommended content irrelevant to a gender among the plurality of recommended contents corresponding to the selected plurality of age stages when the gender matching probability pertaining to none of the first range and the second range.

The processor, in response to there being a plurality of users in the photographed image, may determine each gender of the plurality of users based on feature parts in the photographed image, combine a content which is suitable for a majority of genders between genders of the plurality of users with a content irrelevant to a gender and control the display to display the combined contents.

The processor may prevent a harmful content from being displayed, when the age matching probability with a certain age stage among the selected plurality of age stages exceeds a preset threshold value.

The processor may combine the plurality of recommended contents corresponding to each of the two high ranking age stages with reference to the matching probability among the selected plurality of age stages when the plurality of age stages where the age matching probability with the feature part is equal to or greater than a preset threshold value being selected, and control the display to display the combined recommended contents.

The processor may control the display to display the recommended contents corresponding to each of the selected plurality of age stages sequentially according to the matching probability.

The processor may control the display to display all contents randomly in response to the user not being included in the photographed image for a certain time.

According to an exemplary embodiment, there is provided a display device controlling method including storing feature information of each pre-classified age stage, obtaining a photographed image of a user, comparing a feature part in the photographed image with the feature information of each age stage and calculating an age matching probability of matching the feature part with each age stage, selecting a plurality of age stages among all age stages by comparing the age matching probability with a preset threshold value, and displaying a combined content which includes a plurality of recommended contents corresponding to each of the selected plurality of age stages.

The method may further comprise storing gender feature information, determining the user's gender based on a gender matching probability of matching the feature part with each gender by comparing the feature part in the photographed image with the gender feature information, selecting the plurality of recommended contents corresponding to the selected plurality of age stages and the user's determined gender, and displaying the combined content which includes the plurality of recommended contents.

The displaying the recommended content may includes displaying a recommended content which is suitable for a male among the plurality of recommended contents corresponding to the selected plurality of age stages when the gender matching probability is in a first range, displaying a recommended content which is suitable for a female among the plurality of recommended contents corresponding to the selected plurality of age stages when the gender matching probability is in a second range which is different from the first range, displaying a recommended content irrelevant to a gender among the plurality of recommended contents corresponding to the selected plurality of age stages when the gender matching probability pertaining to none of the first range and the second range.

The displaying the recommended content may further include, in response to there being a plurality of users in the photographed image, determining each gender of the plurality of users based on feature parts in the photographed image, combining a content which is suitable for a majority of genders between genders of the plurality of users with a content irrelevant to a gender and controlling the display to display the combined contents.

The displaying the combined recommended contents may include preventing a harmful content from being displayed when the age matching probability with a certain age stage among the selected plurality of age stages exceeds a preset threshold value.

The displaying the combined recommended contents may include combining the plurality of recommended contents corresponding to each of the two high ranking age stages with reference to the matching probability among the selected plurality of age stages when the plurality of age stages where the age matching probability of matching the feature is equal to or greater than a preset threshold value being selected, and displaying the combined recommended contents.

The displaying the combined recommended contents may include displaying the recommended contents corresponding to each of the selected plurality of age stages sequentially according to the matching probability.

The displaying the combined recommended contents may include displaying all contents randomly in response to the user not being included in the photographed image for a certain time.

According to an exemplary embodiment, there is provided a non-transitory computer-readable recording medium storing a program to execute a display device controlling method, wherein the method includes storing feature information of each pre-classified age stage, obtaining a photographed image of a user, comparing a feature part in the photographed image with the feature information of each age stage and calculating an age matching probability of matching the feature part with each age stage, selecting a plurality of age stages among all age stages by comparing the age matching probability with a preset threshold value, and displaying a combined content which includes a plurality of recommended contents corresponding to each of the selected plurality of age stages.

BRIEF DESCRIPTION OF THE DRAWINGS

FIG. 1 is a view schematically illustrating an operation of a display device according to an exemplary embodiment;

FIGS. 7 and 8 are views provided to explain operations of a display device according to various exemplary embodiments.

DETAILED DESCRIPTION

Figure 2:
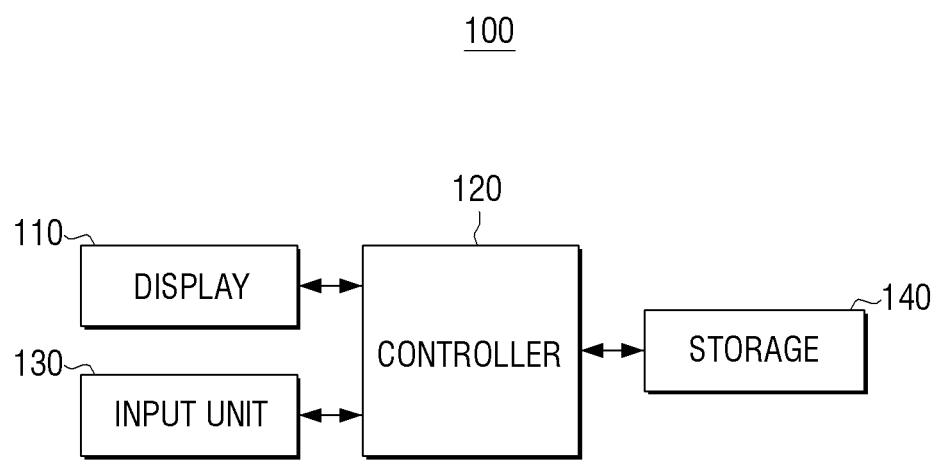
FIG. 2 is a block diagram illustrating a configuration of a display device according to an exemplary embodiment.

Hereinafter, various exemplary embodiments will be explained in detail with reference to the accompanying drawings. In describing the present disclosure, well-known functions and configurations are not described in detail since they would obscure the disclosure in unnecessary detail. In addition, the embodiments to be described hereinafter may be variously modified, and the technical idea of the present disclosure is not limited to the specific embodiments disclosed in the accompanying drawings. The specific embodiments disclosed in the accompanying drawings are merely for easy understanding of the various embodiments of the present disclosure.

As long as there is no special opposite description, "including" an element does not exclude another element but it indicates that another element can be further included. In addition, various elements and areas in the drawings are illustrated schematically. Therefore, the technical idea of the present disclosure is not limited by a relative size or interval illustrated in the enclosed drawings.

FIG. 1 is a view schematically illustrating an operation of a display device according to an exemplary embodiment.

Referring to FIG. 1, a display device 100 providing contents which are personalized to a user is illustrated. Specifically, the display device 100 may provide a personalized content according to an age or a gender of a user who is selected in a user's image which is input by an input unit 130 (e.g., camera) in the display device 100. Herein, the user may be a person who uses the display device 100. Specifically, the user may be a person who stays in front of the display device 100 for a certain time and watches or manipulates the display device 100. However, the user is not limited to those people, and all people whose feature parts can be recognized by the display device 100 may be users. For example, a person who passes in front of the display device 100 and looks back at the display device 100 and a person who stands against the display device 100 and looks back at the display device 100 may be users.

Referring to FIG. 1(a), when a grown male stays near the display device 100, the user's age and gender may be recognized by using the user's image which is input through the input unit 130, and according to a recognized result, a content 11 which is an interest of a grown male such as a car may be displayed.

On the other hand, referring to FIG. 1(b), when a little girl stays near the display device 100, the user's age and gender may be recognized by using the user's image which is input through the input unit 130, and a content 12 which is an interest of a little girl such as a doll may be displayed.

FIG. 1 illustrates that contents are displayed on only one display device but contents may be displayed on a plurality of display devices. Hereinafter, the explanation is based on the assumption that contents are displayed on one display device for the convenience of explanation.

FIG. 2 is a block diagram illustrating a configuration of a display device according to an exemplary embodiment.

Referring to FIG. 2, the display device 100 includes a display 110, a controller 120, an input unit 130 and a storage 140.

The display device 100 is a device that displays various images on a display. Such a display device may be a TV, a monitor, an electric bulletin board, a tablet personal computer (a tablet PC), a portable multimedia player (PMP), a personal digital assistant (PDA), a smartphone, a cell phone, a digital frame and a game player.

The display 110 displays a content. According to an embodiment, the display 110 may be embodied as a single display or a plurality of displays.

The display 110 may display a content which is received from an external server (not illustrated). Specifically, the display 110 may display a content which is personalized to a user between a content received from the external server and a content stored in the storage 140. Also, the display 110 may display a user interface (UI) for performing a voice recognition task corresponding to voice recognition (for example, including a voice command guide) or a motion UI for performing a motion recognition task corresponding to motion recognition (for example, including a user motion guide for motion recognition).

A screen resolution of the display 110 may be resolution of, for example, High Definition (HD), Full HD and Ultra HD, or resolution which is much more clear than the resolution of the Ultra HD.

A diagonal length of the display device 100 may be, for example, 650 mm or shorter, 660 mm, 800 mm, 1,010 mm, 1,520 mm, 1,890 mm, or 2,000 mm or longer than 2,000 mm. A ratio of width and height may be, for example, 4:3, 16:9, 16:10, 21:9 or 21:10.

The controller 120 controls a general operation of the display device 100 and a signal flow among elements 110 to 130 in the display device 100, and performs a data processing function. Also, when a user's input exists or when preset condition which is pre-stored is satisfied, the controller 120 may perform an operation system (OS) and various applications which are stored in the storage 130.

The controller 120 may include a processor, a ROM in which a controlling program is stored for control of the display device 100 and a RAM which is used as a storage area corresponding to various tasks operated in the display device 100.

A processor may perform various controlling operations according to a program or data which is stored in a memory such as a ROM or a RAM. The processor may include a graphic processing unit (not illustrated) for processing a graphic which corresponds to an image or a video. The processor may be embodied as a system on chip (SoC) where a core processor (not illustrated) and a GPU (not illustrated) are integrated. Also, the processor may include a single core processor, a dual-core processor, a triple-core processor, a quad-core processor or a multi-core processor.

The processor may be embodied in a plurality of processors. For example, the processor may be embodied as a main processor (not illustrated) and a sub processor (not illustrated) which performs in a sleep mode. Also, a processor, a ROM, a RAM may be mutually connected by an inner bus.

The controller 120 controls each of configurations in the display device 100. For example, the controller 120 may control the display 110 to display a content personalized to a user based on the user's data which is input through the input unit 130.

Specifically, the controller 120 may determine an age stage and a gender of a user by using a feature part in the user's image which is input through the input unit 130. Here, the feature part indicates certain part such as an eye, a mouth or skin of the user in the user's image which can be used to recognize an age of the user. The feature part also may include certain part such as a face shape, an eye shape or an eye brow which can be used to recognize a gender of the user.

More specifically, the controller 120 may compare feature database stored in the storage 140 with a feature part in a photographed image where a user is photographed and calculate a probability of matching the feature part with each age stage (age matching probability) and a probability of matching the feature part with each gender (gender matching probability). The controller 120, in all age stages stored in the storage 140, may select a plurality of age stages where an age matching probability of matching with a feature part of a photographed image is equal to or greater than a preset threshold value. The controller 120 may determine a gender of the user based on the gender matching probability of matching the feature part with each gender.

The controller 120 may combine recommended contents corresponding to the selected plurality of age stages and display the combined recommended contents. Here, the controller 120 may control the display 110 to display contents sequentially according to probabilities of matching with age stages.

Hereinabove, the explanation is based on the assumption that there are a plurality of age stages where a probability of matching with a feature part is equal to or greater than a preset threshold value. However, when the present disclosure is actually embodied, when there is only one age stage where a probability of matching with a feature part is equal to or greater than a preset threshold value, the controller 120 may control the display 110 to display a content corresponding to that one age stage.

If a probability of matching with a certain age stage among the selected plurality of age stages is equal to or greater than a preset value, the controller 120 may prevent a harmful content from being displayed among recommended contents corresponding to the selected plurality of age stages. Herein, the certain age stage may be a juvenile age stage including ages of 0 to 19. Specifically, if a user's age pertains to a juvenile age stage, the controller 120 may prevent a harmful content from being provided to the user by preventing a harmful content from being received, by pixelating a part of a harmful content or an entire harmful content and displaying the same, or by overlaying a description phrase on a harmful content (which is an on-screen display).

For example, when a user is juvenile age of 18, even if probabilities of matching with 20s' age stages are high, if a probability of matching with the juvenile age stage is equal to or greater than a preset value, the controller 120 may prevent a harmful content among recommended contents corresponding to a plurality of selected age stages from being displayed.

The controller 120 may display a recommended content corresponding to a determined gender of a user. If a gender cannot be determined, the controller 120 may display a content which is irrelevant to a gender. Specifically, when a probability of matching a feature of the user with a gender is not included in a preset range, the controller 120 may display a content which is irrelevant to a gender. When there are a plurality of users, the controller 120 may combine a content corresponding to a majority of genders and a content which is irrelevant to a gender, and may control the display 110 to display the combined contents.

The controller 120 may display contents corresponding to a selected plurality of age stages or a gender sequentially, may control the display 110 to display a plurality of contents on one screen at the same time, and may control the display 110 to display a plurality of thumbnails for selecting a content.

The controller 120 may control the display 110 to display all contents randomly when a user's image is not input. Specifically, if a user is not included in a photographed image which is input by the input unit 130 for a certain time, the controller 120 may control the display to display all contents randomly. For example, while the display device 100 provides a content suitable for a user since the user is in an area where the display device 100 can recognize, if the user gets out of the recognizable area, the display device 100 may display all contents randomly again. Herein, the controller 120 may control the display to display a content except for a harmful content.

The input unit 130 (e.g., inputter or input device) receives an input of a user's image. The input unit 130 may be a photographing part such as a camera for generating the user's image which is equipped in the display device 100. Also, the input unit 130 may be a microphone of receiving the user's voice.

In addition to directly receiving an input of user's data while being equipped with the display device 100, the input unit 130 may receive a user's image or the user's voice which is generated by an exterior apparatus.

The storage 140 may store a controlling program for control of the display device 100 and the controller 120, an application which is originally provided by a producing company or downloaded from an exterior, a graphical user interface (GUI) which is related to the application, and an object for providing the GUI (for example, an image text, an icon, a button, etc.). For example, a user's information may include a user's identifier (ID), passwords, the user's name, biometric information of the user (for example, fingerprint, iris, pulse, blood pressure, body temperature, etc.).

The storage 140 may include a various software modules such as a broadcasting receiver module, a channel controller module, a volume controller module, a communications controller module, a voice recognition module, a motion recognition module, an optical receiver module, a display controller module, an audio controller module, a camera controller module, an exterior input controller module, a power controller module, a power controller module of a mobile device which is wirelessly connected (for example, Bluetooth), voice database (DB), DB of feature information corresponding to each classified age stage, DB of feature information corresponding to each gender, a contents list corresponding to an age stage, a contents list corresponding to a gender, a list of contents which are irrelevant to a gender or a harmful contents list, which are not illustrated.

The controller's modules and DB which are not illustrated in the storage 140 may be embodied in a software form in order to carry out a controlling function for broadcasting reception, a channel controlling function, a volume controlling function, a communications controlling function, a voice recognition function, a motion recognition function, an optical reception controlling function, a display controlling function, an audio controlling function, a camera controlling function, an exterior input controlling function, a power controlling function or a power controlling function of a mobile device which is wirelessly connected (for example, Bluetooth). The controller may perform each function by using these software programs which are stored in the storage.

In the exemplary embodiment, a phrase "a storage of the display device 100" may include the storage 140, a ROM or a RAM of the controller, or a memory card (for example, a micro SD card, a USB memory, which are not illustrated) which is equipped with the display device 100. Also, the storage 140 may include a non-volatile memory, a volatile memory, a hard disk drive (HDD) or a solid state drive (SSD).

Figure 3:
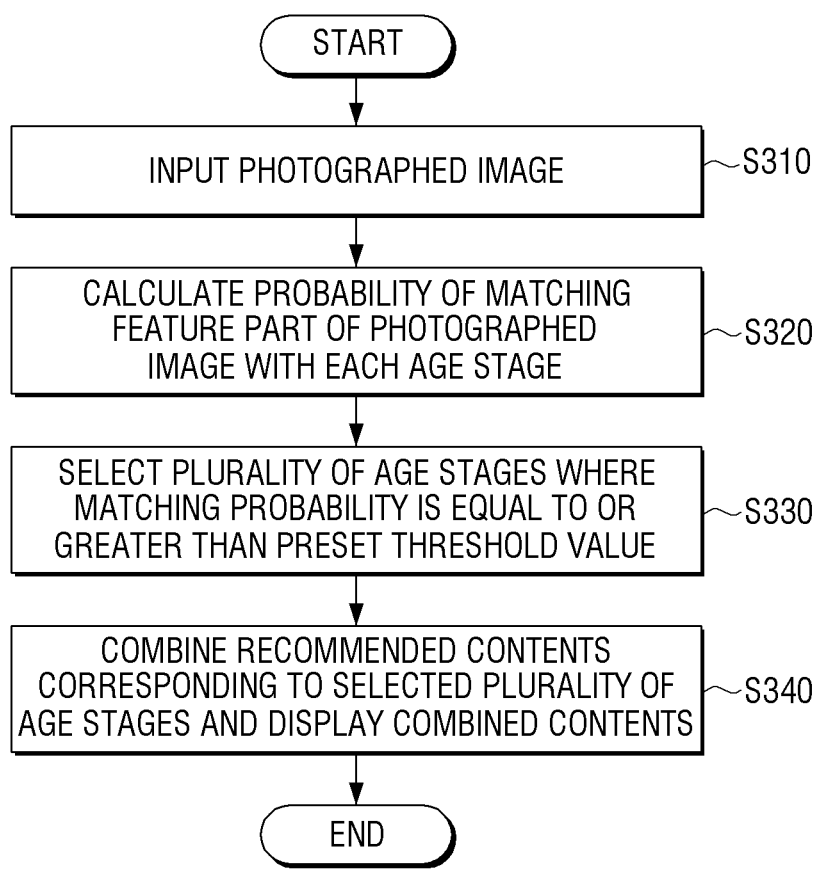
FIG. 3 is a flowchart schematically illustrating a content providing method according to an exemplary embodiment.

FIG. 3 is a flowchart schematically illustrating a content providing method according to an exemplary embodiment.

Referring to FIG. 3, first of all, the display device inputs a photographed user's image (S310). Specifically, the display device may receive the user's image by using a photographing part which is equipped with the display device. Hereinabove, the explanation is based on generating a user's image and receiving the user's image in the display device itself. However, when the present disclosure is embodied, the display device may receive an input of a user's image through an exterior photographing device.

In addition to a user's image, the user's data to be input may be various data such as the user's voice by which the user's age or gender may be recognized.

Meanwhile, even though not illustrated, all age stages may be classified before a user's image is input and feature information corresponding to each classified age stage may be stored in the storage.

The display device calculates a probability of matching a feature part in the input photographed image with each age stage (S320). Specifically, the display device may compare the feature part in the input photographed image with the feature information corresponding to each age stage, and may calculate a probability of matching the feature part with each age stage.

Figure 4:
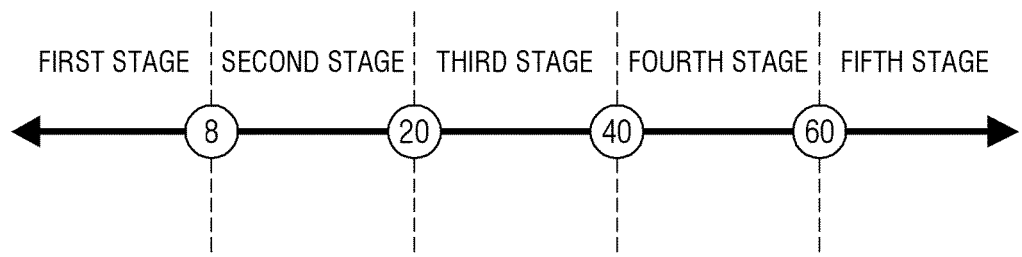
FIG. 4 is a view illustrating an example of age stage classification according to an exemplary embodiment.

More specifically, the display device, by comparing the feature part in the user's image and DB including feature information corresponding to each pre-stored age stage of the age stages which are classified in plural age stages as illustrated in FIG. 4 (detailed explanation will be made with reference to FIG. 4), may calculate a probability of matching the feature part of the user's photographed image with each age stage.

The display device may select a plurality of age stages where the probability of matching with the feature part is equal to or greater than a preset threshold value (S330). Specifically, the display device may select a plurality of age stages where a probability of matching the feature part in the user's photographed image with feature information corresponding to each age stage is equal to or greater than a preset threshold value. Herein, a reference for selecting a plurality of age stages, a preset threshold value of a matching probability may be a default value which is input when the display device is produced or a value which is preset by a content provider.

Hereinabove, the explanation is based on calculating a probability of matching a feature part in a user's photographed image with each age stage in order to select a plurality of age stages to provide contents. However, a plurality age stages may be selected by determining whether or not the feature part matches to each age stage without calculating a matching probability.

Recommended contents corresponding to the plurality of selected age stages are combined and displayed (S340). The number of age stages by which recommended contents are displayed among the plurality of selected age stages may be a default value which is input when the display device is produced or a value which is preset by a content provider. For example, when there are two age stages by which recommended contents are displayed, the display device may combine the recommended contents corresponding to the two high ranking age stages where a probability of matching with a user is high among all age stages and display the combined recommended contents.

Herein, the display device may display recommended contents sequentially according to a matching probability. For example, the display device may display all recommended contents corresponding to an age stage where a matching probability is the highest, and then the display device may display recommended contents corresponding to another age stage where a matching probability is the next highest. Also, the display device may adjust a ratio of recommended contents corresponding to a probability of matching with each age stage and then display recommended contents.

Hereinabove, the explanation is based on the limitation that there are a plurality of age stages where a probability of matching with a feature part is equal to or greater than a preset threshold value. However, in an actual embodiment of the present disclosure, when there is one age stage where a probability of matching with a feature part is equal to or greater than a present threshold value, the display may display a content corresponding to that age stage.

FIG. 4 is a view illustrating an example of age stage classification according to an exemplary embodiment.

Referring to FIG. 4, age stages according to an exemplary embodiment may be classified in five stages: 0 to 7 years old pertains to a first stage, 8 to 19 years old pertains to a second stage, 20 to 39 years old pertains to a third stage, 40 to 59 years old pertains to a fourth stage and 60 years old or older pertains to a fifth stage. Herein, the first stage and the second stage may be classified as juvenile age stages which include children and the youth. Hereinabove, the explanation is based on that ages are classified in five stages but when the present disclose is embodied, ages may be classified in four stages or less, or six stages or more, and an age range of each stage may also be differently embodied.

Figure 5:
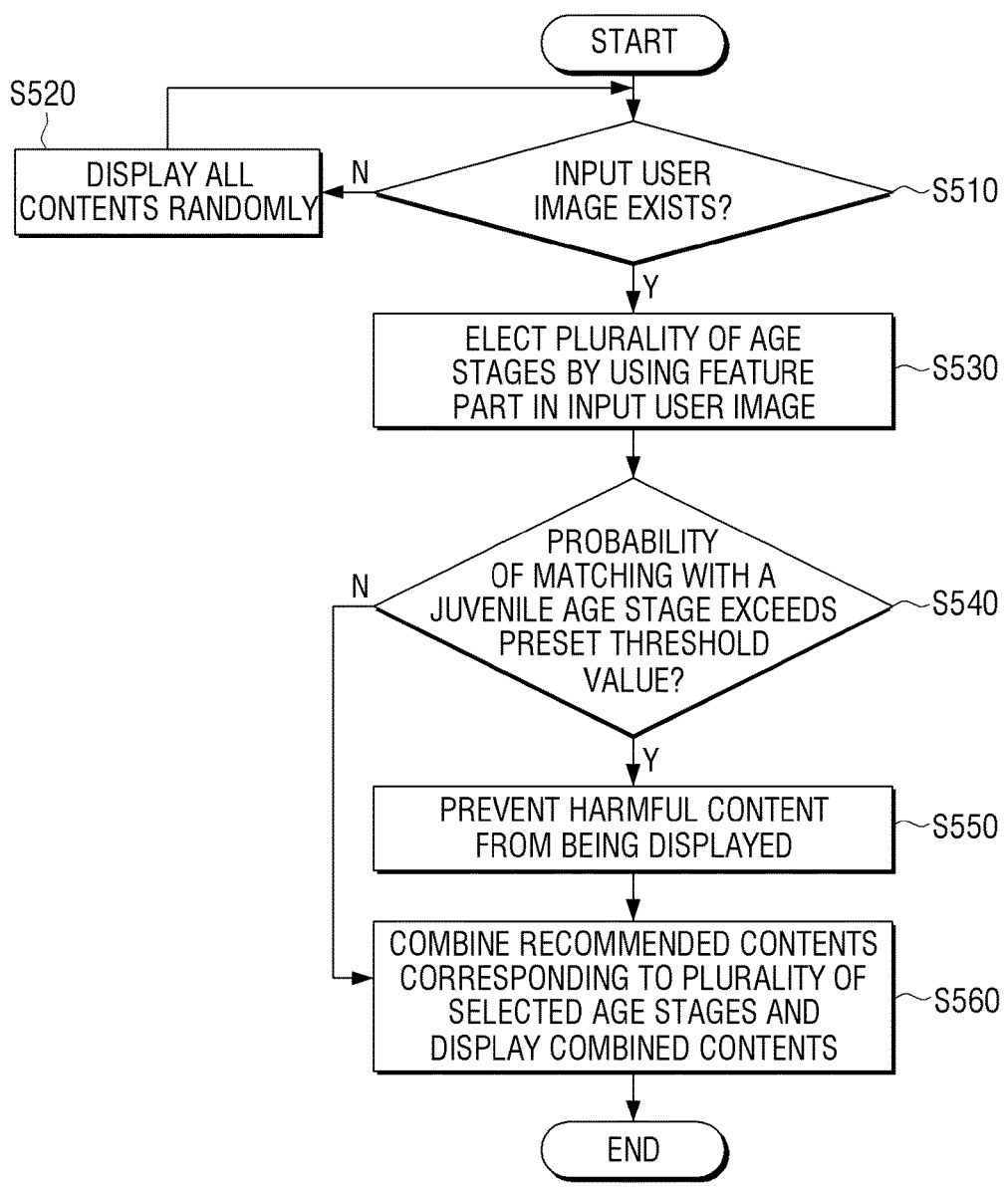
FIG. 5 is a flowchart provided to explain a content providing method according to an exemplary embodiment.

FIG. 5 is a flowchart provided to explain a content providing method according to a plurality selected age stages according to an exemplary embodiment.

Referring to FIG. 5, first of all, whether there is an user's image which is input to the display device is determined (S510). Herein, the display device determines whether a user is in a recognizable area by using a change of an image which is input through a sensor such as an infrared ray sensor or a motion sensor which can recognize a user's movement, or through an equipped photographing part. When a user's image does not exist since there is no user in a distance where the display device can recognize (S510-N), the display device displays all contents randomly (S520). Herein, the display device may display all contents sequentially, in ascending order or in descending order, according to each age stage.

When a user's image which is input exists since a user is in a distance where the display device can recognize (S510-Y), the display device selects a plurality of age stages by using a feature part in the input user's image (S530).

Specifically, the display device selects a plurality of age stages where a probability of matching with the feature part is equal to or greater than a preset threshold value among all age stages. Herein, the process of selecting the plurality of age stages is identical to what is described regarding FIG. 3. Therefore, detailed description thereof is omitted.

The display device determines whether, among the plurality of selected age stages, a probability of matching with a juvenile age stage exceeds a preset threshold value (S540). Herein, the preset threshold value may be a default value which is input when the display device is produced or a value which is preset by a content provider.

When the probability of matching with a juvenile age stage exceeds the preset threshold value (S540-Y), the display device may block a harmful content (S550). Herein, the harmful content means a content such as an ad for alcohol, cigarette, a harmful site or a harmful facility, which is not suitable to be provided to a child or a youth who is juvenile. Herein, blocking a harmful content may indicate preventing a harmful content from being displayed on the display device. Specifically, when a user pertains to a juvenile age stage, the display device may prevent a harmful content from being provided to the user by preventing a harmful content from being received, by pixelating a part of a harmful content or an entire harmful content and displaying the same, or by overlaying a description phrase on a harmful content which may be an on-screen display.

For example, when a threshold value is set to 40% and the number of age stages by which recommended contents are displayed is set to two, referring to the age stage classification example of FIG. 4, if it is recognized that a probability of matching a user with the first stage is 5%, a probability of matching the user with the second stage is 41% and a probability of matching the user with the third stage is 50%, since the probability of matching the user with the second stage exceeds 40%, contents corresponding to the second stage and the third stage except for a harmful content may be combined and displayed. Hereinabove, the explanation is based on the case that a probability of matching with one age stage between the first stage and the second stage which are juvenile age stages exceeds a preset threshold value. However, when the present disclosure is embodied, it may be set to exclude a harmful content when a sum of matching probabilities of juvenile age stages exceeds a preset threshold value.

In addition, when a plurality of users are in an area where the display device can recognize, if a probability of matching at least one of the plurality of users with a juvenile age stage exceeds a preset threshold value, the display device may block a harmful content.

When a probability of matching a user with a juvenile age stage does not exceed a preset threshold value (S540-N), the display device combines recommended contents corresponding to the selected plurality age stages without excluding a harmful content and displays the combined recommended contents (S560). Herein, the display device may display recommended contents corresponding to the plurality of age stages sequentially according to a matching probability.

Figure 6:
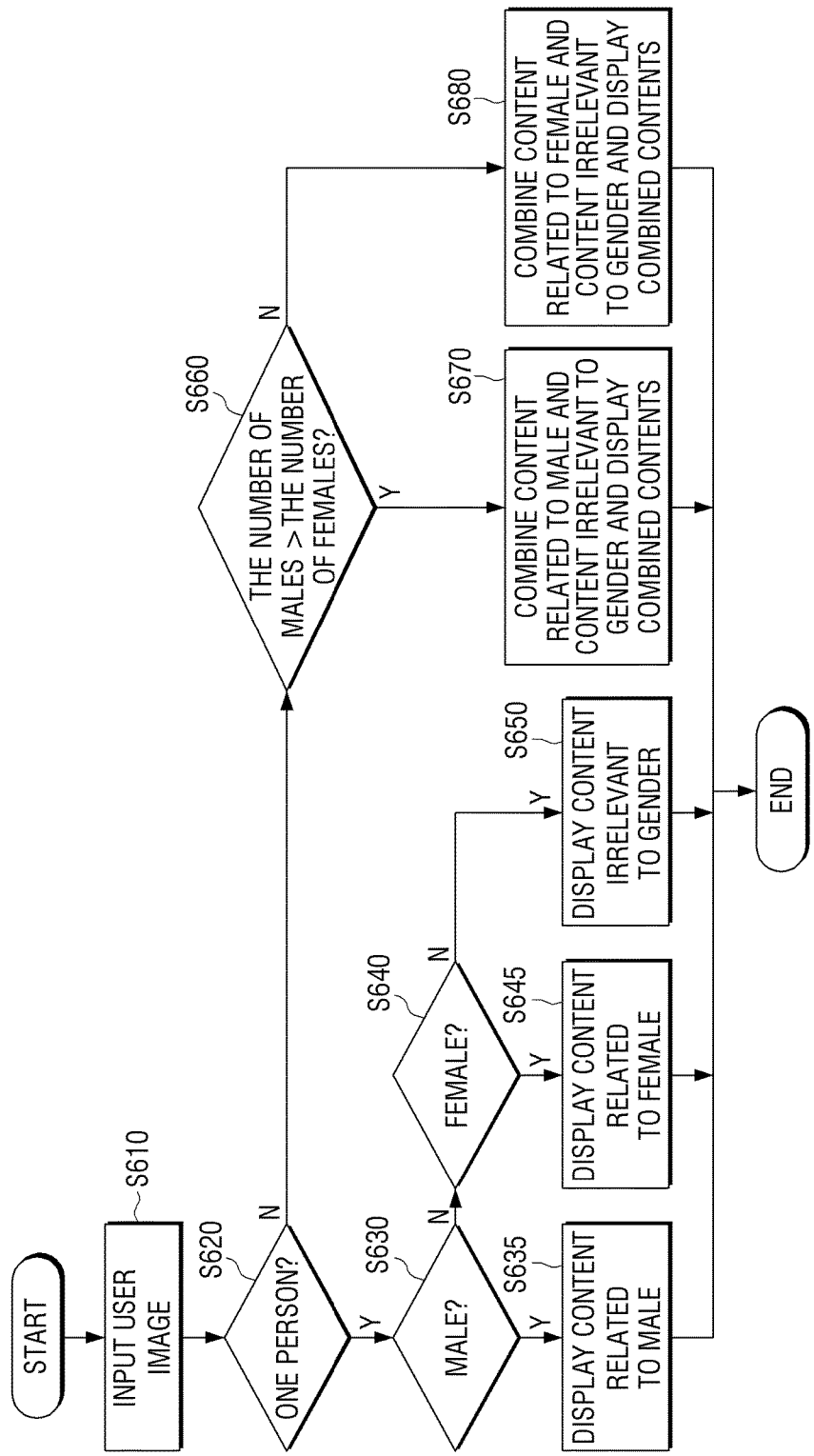
FIG. 6 is a flowchart provided to explain a content providing method according to another exemplary embodiment.

FIG. 6 is a flowchart provided to explain a content providing method corresponding to a user's gender according to another exemplary embodiment.

Referring to FIG. 6, first of all, whether a user's image which is input to the display device exists is determined. When there is no input of a user's image since a user is not in an area where the display device recognizes, the display device displays all contents randomly.

However, when a user is in a recognizable area of the display device, the user's image is input (S610). Herein, the input image may be generated by a photographing part which is equipped with the display device or generated by an exterior device which is separately equipped. Hereinabove, the explanation is based on the limitation where input user data is an image. However, when the present disclosure is embodied, the user's data may include all the user's data such as voice which can be used to determine the user's gender.

By using the input user's data, whether there is a user or there are a plurality of users in a recognizable area of the display device is determined (S620). If a recognized user is one (S620-Y), the user's gender is determined based on a probability of matching a feature part in an input photographed image with each gender (S630, S640). Herein, the feature part may include certain part such as a face shape, eye shape, eyebrow, etc. which may be data for recognizing a gender.

Specifically, the display device may determine a user's gender by using a feature part in a user's image. In other words, the display device compares DB including a feature part in the user's image and pre-stored gender feature information, calculates a probability of matching the user with each gender, and when the matching probability exceeds a preset threshold value, determines that the user pertains to a gender with which a probability of matching exceeds the threshold. Herein, the threshold value may be a default value which is input when the display device is produced or may be a value set by a content provider.

All ranges for the calculated probability of matching with gender may be constituted of a first range, a second range which is different from the first range and a range which is out of both the first range and the second range. Specifically, the first range may be a range where a probability of matching a feature part with a male exceeds a preset threshold value. The second range may be a range which is not overlapped with the first range and it may be a range where a probability of matching a feature part with a female exceeds the preset threshold value. The range which is out of the first range and the second range may be a range where a probability of matching a feature part with a male or a female does not exceed the preset threshold value.

Specifically, the display device determines whether a user is a male or a female (S630). When a probability of matching a user with a male exceeds a preset threshold value (S630-Y), the display device may display a content which is related to a male such as a car and men's suit (S635).

When a probability of matching the user with a male does not exceed the preset threshold value (S630-N), the display device determines whether the user is a female (S640). When a probability of matching the user with a female exceeds the preset threshold value (S640-Y), the display device displays a content which is related to a female such as cosmetics and women's clothes (S645).

When the probability of matching the user with a female does not exceed the preset threshold value (S640-N), in other words, when the probability of matching the user with a male and the probability of matching the user with a female do not exceed the preset threshold value, the display device displays a content which is irrelevant to a gender such as travel and a cell phone (S650).

Hereinabove, for the convenience of explanation, whether a user is a male is first determined. However, when the present disclosure is embodied, whether a user is a female may be determined first, or whether a user is a male or female may be determined at the same time.

For example, if it is assumed that a threshold value is 70% and a probability of matching a user with a male is recognized as 40% (a probability of matching the user with a female is 60%), since none of the probability of matching the user with a male and the probability of matching the user with a female exceeds 70%, the display device may display a content irrelevant to a gender.

When a plurality of users are recognized to the display device 100 (S620-N), the display device determines each user's gender by using a feature part of each user in an input image and determines which gender is the majority. For example, the display device determines whether males are the majority among the plurality of users (S660). When the number of males among the plurality of users is greater than the number of females (S660-Y), the display device combines a content related to a male and a content irrelevant to a gender and displays the combined contents (S670). When the number of females among the plurality of users is greater than the number of males (S660-N), the display device combines a content related to a female and a content irrelevant to a gender and displays the combined contents (S680).

Hereinabove, since genders have no sequence unlike age, for the convenience of explanation, the explanation is based on that a content pertaining to the minority gender of the plurality of users is not displayed. However, when the present disclosure is embodied, according to a ratio of male and female, a ratio of contents may be adjusted corresponding to each gender and the contents may be displayed based on the adjusted ratio.

FIGS. 7 and 8 are views provided to explain operations of a display device according to various exemplary embodiments.

FIG. 7 illustrates an operation example of the display device. The drawing illustrates a contents-providing operation of the display device when a plurality of users of two grown men, one little boy and one little girl are in an area where the input unit 130 of the display device 100 can recognize the users.

Referring to FIG. 7, the display device 100 sequentially provides contents related to a car 71, sportswear 72, a robot 73 and a cartoon character 74.

Specifically, since there are children who are in a juvenile age stage among the plurality of users, a harmful content may be excluded and since the majority of the users are male, a content related to a female may be excluded.

Therefore, the contents related to a car and sportswear which are related to interests of a grown male, the content about a robot which is related to a little boy's interest and the content about a cartoon character which is related to a children's interest but irrelevant to a gender may be provided. Meanwhile, when the present disclosure is embodied, it is not limited to the illustrated contents and sequence. Even though it is not illustrated, a plurality of contents may be displayed in one screen and a plurality of thumbnail images for a plurality of contents may be displayed on one screen so that a user may select a content.

FIG. 8 is another exemplary embodiment of an operation of the display device. It is a drawing to illustrate a contents-providing operation of the display device when a plurality of users of three females including one old lady and one grown male are in an area where the input unit 130 of the display device 100 can recognize the users.

Referring to FIG. 8, the display device 100 sequentially provides contents related to cosmetics 81, women's clothes 82, health food 83 and liquor 84.

Specifically, since a user in a juvenile age stage is not included in the plurality of users, a harmful content such as liquor may be provided and since the majority of the users are female, a content related to a male may be excluded.

Therefore, the contents related to cosmetics and women's clothes which are grown-up women's interests, the content of health food (red ginseng) related to an old lady's interest and the content about liquor which pertains to a harmful content but irrelevant to a gender may be provided. Meanwhile, when the present disclosure is actually embodied, it is not limited to the illustrated contents and sequence. Even though it is not illustrated, a plurality of contents may be displayed in one screen, and a plurality of thumbnail images for a plurality of contents may be displayed on one screen so that a user may select a content.

Figure 9:
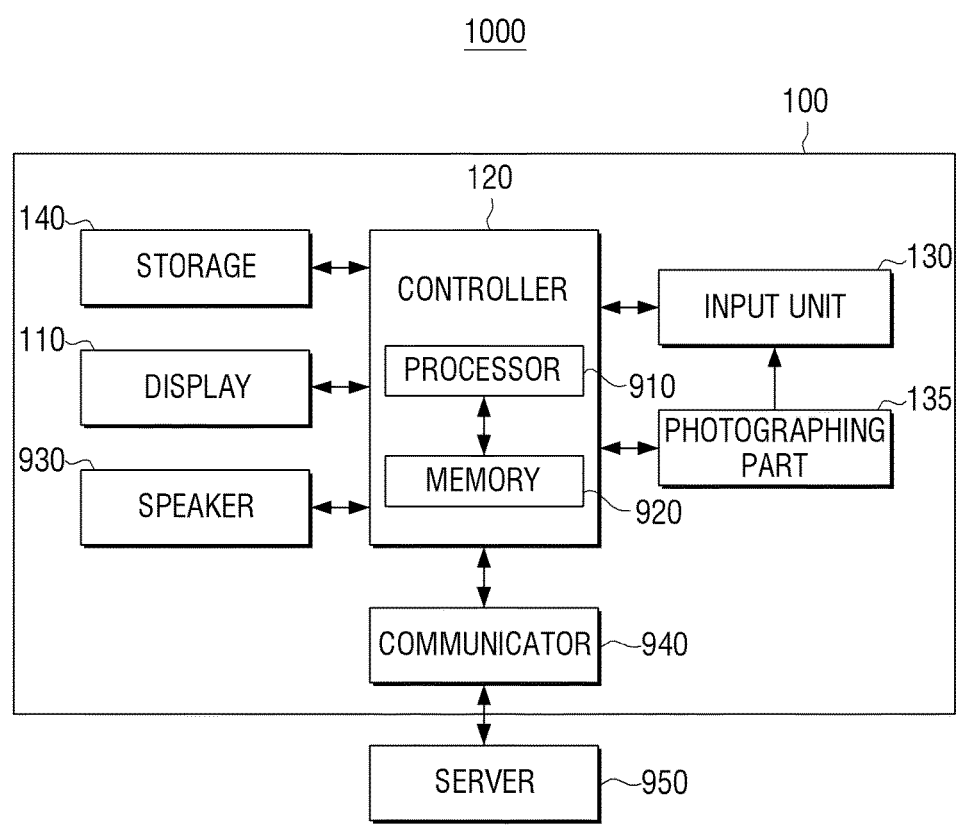
FIG. 9 is a block diagram illustrating a configuration of a display device in detail according to an exemplary embodiment.

FIG. 9 is a block diagram illustrating a configuration of a display device in detail according to an exemplary embodiment.

Referring to FIG. 9, the display system 1000 includes the display device 100 and an exterior server 950. Specifically, the display device 100 includes the display 110, the controller 120, a processor 910, a memory 920, the input unit 130, a photographing part 135, the storage 140, a speaker 930 and a communicator 940.

The display 110 may be embodied as a single display as described the above or a plurality of displays.

The controller 120 includes the processor 910 and the memory 920. The processor 910 performs various controlling operations by executing a program stored in the memory 920. In the memory 920, various soft modules such as a broadcasting receiver module, a communications controller module, a voice recognition module, a motion recognition module, display controller module, an audio controller module, a camera controller module, an exterior input controller module, a power controller module, and a power controller module of a mobile device which is wirelessly connected (for example, Bluetooth) may be stored. These software modules may be embedded in the memory 920, or may be provided to the processor 910 by being copied in the memory 920 in a state of being stored in the storage 140. The processor 910 may execute the controlling operations which are explained in the various exemplary embodiments by executing various software modules which are stored in the memory 920.

The input unit 130 is an element for receiving various user data. The input unit 130 may be embodied in a manner of inputting a user's image which is generated by the photographing part 135 or in a manner of inputting a user's image which is received from an exterior device. The controller 120 performs various controlling operations according to a user's image which is input through the input unit 130.

The storage 140 stores various programs and data which are used for operations of the display system 1000. For example, the storage 140 may store operating system (O/S) software, middleware, various applications, various data which is input or set while an application operates, contents and other setting information.

The speaker 930 is an element which outputs various sound data included in a content that is displayed.

The communicator 940 may communicate with an exterior server device 950, a host device or other source devices. According to a kind or using environment of the display system 1000, the communicator 940 may communicate in various communications systems. Specifically, communications is executed by using a wire interface such as a universal serial bus (USB) and also executed in systems of wired LAN, WiFi, WiFi-Direct, Bluetooth, Zigbee, near field communication (NFC).

FIG. 9 only illustrates an example of the detailed configuration of the display system. According to an embodying example of the display system 1000, an element among the elements illustrated in FIG. 9 may be omitted or changed, or another element may be further added. For example, when the display system 1000 is embodied as a mobile terminal, digital multimedia broadcasting (DMB) receiver (not illustrated) which receives and processes a DMB signal may be further added.

As explained the above, according to various exemplary embodiments, even though misrecognition on a user's age or gender occurs, contents that reduces repulsion of a user who watches may be provided.

The methods in the above exemplary embodiments may be realized in a form of a program command which is executable by various computer means and recorded in a non-transitory computer-readable recording medium. The non-transitory computer-readable recording medium may include a program command, a data file, a data structure, or a combination thereof. For example, the non-transitory computer-readable recording medium may be stored in a volatile or non-volatile recording medium including a ROM, a memory including a RAM, a memory chip, a device, or an integrated circuit, or a recording medium including a Compact Disk (CD), a Digital Versatile Disk (DVD), a magnetic disk, a magnetic tape, which may be recorded optically or magnetically, and may be read by a machine (for example, a computer), regardless of whether or not data is deletable or rewritable. The non-transitory computer-readable recording medium may be an example of a recording medium which is readable by a machine suitable for storing a program or programs including instructions for executing the embodiments of the present disclosure. The program command recorded in the recording medium may be specially designed and configured for the present disclosure or may be publicly known to those skilled in the art of computer software.

As above, a few embodiments have been shown and described. The foregoing embodiments and advantages are merely exemplary and are not to be construed as limiting the present inventive concept. The present teaching can be readily applied to other types of devices.

Also, the description of the embodiments is intended to be illustrative, and not to limit the scope of the claims, and many alternatives, modifications, and variations will be apparent to those skilled in the art.

What is claimed is:

1. A display device, comprising:
a display configured to display a content;
an inputter configured to obtain a photographed image of a user;
a memory configured to store feature information of each age stage of pre-classified age stages; and
a processor configured to compare a feature part in the photographed image with the feature information of each age stage of the pre-classified age stages stored in the memory, and calculate an age matching probability of matching the feature part with each age stage of the pre-classified age stages,
wherein the processor is configured to select a plurality of age stages including a first age stage and a second age stage among all of the pre-classified age stages by comparing the age matching probability with a preset threshold value, and control the display to display recommended contents including at least one content of a plurality of contents corresponding to the first age stage and at least one content of a plurality of contents corresponding to the second age stage, and wherein the processor is configured to adjust a ratio of the recommended contents according to a first age matching probability of matching the feature part calculated for the first age stage and a second age matching probability of matching the feature part calculated for the second age stage and control the display to display the recommended contents having the adjusted ratio.

2. The display device as claimed in claim 1, wherein:
the memory further stores gender feature information; and
the processor is configured to determine the user's gender based on a gender matching probability of matching the feature part with each gender by comparing the feature part in the photographed image with the gender feature information, select the recommended contents corresponding to the selected plurality of age stages and the user's determined gender, and control the display to display the recommended contents.

3. The display device as claimed in claim 2, wherein the processor is configured to control the display to display contents which are suitable for a male among the recommended contents corresponding to the selected plurality of age stages when the gender matching probability is in a first range, control the display to display contents which are suitable for a female among the recommended contents corresponding to the selected plurality of age stages when the gender matching probability is in a second range which is different from the first range, and control the display to display contents irrelevant to a gender among the recommended contents corresponding to the selected plurality of age stages when the gender matching probability pertaining to none of the first range and the second range.

4. The display device as claimed in claim 2, wherein the processor is configured to, in response to there being a plurality of users in the photographed image, determine each gender of the plurality of users based on feature parts in the photographed image, select contents which are suitable for a majority of genders between the determined genders and contents irrelevant to a gender as the recommended contents and control the display to display the recommended contents.

5. The display device as claimed in claim 1, wherein the processor is configured to prevent a harmful content from being displayed, when the age matching probability with a certain age stage among the selected plurality of age stages exceeds a preset threshold value.

6. The display device as claimed in claim 1, wherein the processor is configured to select the recommended contents corresponding to two highest ranking age stages with reference to the age matching probability among the selected plurality of age stages when the plurality of age stages where the age matching probability with the feature part is equal to or greater than a preset threshold value being selected, and control the display to display the recommended contents.

7. The display device as claimed in claim 1, wherein the processor is configured to control the display to display the recommended contents corresponding to the selected plurality of age stages sequentially according to the age matching probability.

8. The display device as claimed in claim 1, wherein the processor is configured to control the display to display all contents randomly in response to the user not being included in the photographed image for a certain time.

9. A display device controlling method, comprising:
storing feature information of each age stage of pre-classified age stages;
obtaining a photographed image of a user;
comparing a feature part in the photographed image with the feature information of each age stage of the pre-classified age stages and calculating an age matching probability of matching the feature part with each age stage of the pre-classified age stages;
selecting a plurality of age stages including a first age stage and a second age stage among all of the pre-classified age stages by comparing the age matching probability with a preset threshold value; and
displaying recommended contents including at least one content of a plurality of contents corresponding to the first age stage and at least one content of a plurality of contents corresponding to the second age stage,
wherein the displaying the recommended contents comprises adjusting a ratio of the recommended contents according to a first age matching probability of matching the feature part calculated for the first age stage and a second age matching probability of matching the feature part calculated for the second age stage and displaying the recommended contents having the adjusted ratio.

10. The method as claimed in claim 9, further comprising:
storing gender feature information;
determining the user's gender based on a gender matching probability of matching the feature part with each gender by comparing the feature part in the photographed image with the gender feature information;
selecting the recommended contents corresponding to the selected plurality of age stages and the user's determined gender, and
displaying the recommended contents.

11. The method as claimed in claim 10, wherein the displaying the recommended contents comprises:
displaying contents which are suitable for a male among the recommended contents corresponding to the selected plurality of age stages when the gender matching probability is in a first range;
displaying contents which are suitable for a female among the recommended contents corresponding to the selected plurality of age stages when the gender matching probability is in a second range which is different from the first range;
displaying contents irrelevant to a gender among the recommended contents corresponding to the selected plurality of age stages when the gender matching probability pertaining to none of the first range and the second range.

12. The method as claimed in claim 10, wherein the displaying the recommended contents further comprises:
in response to there being a plurality of users in the photographed image, determining each gender of the plurality of users based on feature parts in the photographed image, selecting contents which are suitable for a majority of genders between genders of the plurality of users and contents irrelevant to a gender as the recommended contents and controlling a display to display the recommended contents.

13. The method as claimed in claim 9, wherein the displaying the recommended contents comprises preventing a harmful content from being displayed when the age matching probability with a certain age stage among the selected plurality of age stages exceeds a preset threshold value.

14. The method as claimed in claim 9, wherein the displaying the recommended contents comprises selecting the recommended contents corresponding to two highest ranking age stages with reference to the age matching probability among the selected plurality of age stages when the plurality of age stages where the age matching probability of matching the feature part is equal to or greater than a preset threshold value being selected, and displaying the recommended contents.

15. The method as claimed in claim 9, wherein the displaying the recommended contents comprises displaying the recommended contents corresponding to the selected plurality of age stages sequentially according to the age matching probability.

16. The method as claimed in claim 9, wherein the displaying the recommended contents comprises displaying all contents randomly in response to the user not being included in the photographed image for a certain time.

17. A non-transitory computer-readable recording medium storing a program to execute a display device controlling method, wherein the method comprises:

storing feature information of each age stage of pre-classified age stages;

obtaining a photographed image of a user;

comparing a feature part in the photographed image with the feature information of each age stage of the pre-classified age stages and calculating an age matching probability of matching the feature part with each age stage of the pre-classified age stages;

selecting a plurality of age stages including a first age stage and a second age stage among all of the pre-classified age stages by comparing the age matching probability with a preset threshold value; and displaying recommended contents including at least one content of a plurality of contents corresponding to the first age stage and at least one content of a plurality of contents corresponding to the second age stage, wherein the displaying the recommended contents comprises adjusting a ratio of the recommended contents according to a first age matching probability of matching the feature part calculated for the first age stage and a second age matching probability of matching the feature part calculated for the second age stage and displaying the recommended contents having the adjusted ratio.

\* \* \* \* \*